(12) United States Patent
Elgimiabi et al.

(10) Patent No.: US 8,188,165 B2
(45) Date of Patent: May 29, 2012

(54) FIRE-RETARDANT LOW-DENSITY EPOXY COMPOSITION

(75) Inventors: Sohaib Elgimiabi, Neuss (DE); Alain H. Lamon, Maisons-Laffitte (FR)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/721,833

(22) PCT Filed: Dec. 23, 2005

(86) PCT No.: PCT/US2005/046940
§ 371 (c)(1),
(2), (4) Date: Jun. 15, 2007

(87) PCT Pub. No.: WO2006/071820
PCT Pub. Date: Jul. 6, 2006

(65) Prior Publication Data
US 2008/0167412 A1    Jul. 10, 2008

(30) Foreign Application Priority Data
Dec. 23, 2004    (EP) .................................. 04030580

(51) Int. Cl.
*C08K 13/00* (2006.01)
*C08K 9/02* (2006.01)
*C08L 63/00* (2006.01)

(52) U.S. Cl. ........ 523/400; 523/451; 252/601; 252/609; 524/81; 524/414; 524/436; 524/437

(58) Field of Classification Search .................. 260/831; 428/63, 413, 209; 524/101, 404, 432, 326, 524/81, 414, 436–437, 495–496; 523/400, 523/451; 252/601, 609
See application file for complete search history.

(56) References Cited

U.S. PATENT DOCUMENTS

| | | | |
|---|---|---|---|
| 3,018,262 A | 1/1962 | Schroeder | |
| 3,445,436 A | 5/1969 | Lake et al. | |
| 3,615,972 A * | 10/1971 | Morehouse, Jr. et al. | 156/79 |
| 4,145,369 A | 3/1979 | Hira et al. | |
| 4,861,643 A | 8/1989 | Scollard | |
| 5,019,605 A | 5/1991 | Jannic | |
| 5,834,526 A * | 11/1998 | Wu et al. | 521/56 |
| 6,635,202 B1 | 10/2003 | Bugg et al. | |
| 2001/0049009 A1 * | 12/2001 | Cooray et al. | 428/209 |
| 2003/0069321 A1 * | 4/2003 | Lin et al. | 521/159 |
| 2004/0024255 A1 * | 2/2004 | Wang et al. | 568/8 |
| 2004/0262801 A1 * | 12/2004 | Hojaji et al. | 264/44 |

FOREIGN PATENT DOCUMENTS

| | | |
|---|---|---|
| EP | 0 459 951 A2 | 12/1991 |
| EP | 0 693 092 B1 | 1/1996 |
| EP | 0 814 121 B1 | 12/1997 |
| EP | 0 838 499 A1 | 4/1998 |
| WO | WO 99/45061 | 9/1999 |

OTHER PUBLICATIONS

Lee and Neville, "Handbook of Epoxy Resins", McGraw Hill Book Co., New York, 1967.

* cited by examiner

*Primary Examiner* — Vasu Jagannathan
*Assistant Examiner* — Hannah Pak
(74) *Attorney, Agent, or Firm* — Philip Y. Dahl

(57) ABSTRACT

The present invention relates to a curable precursor of a fire-retardant, low-density and essentially halogen-free epoxy composition comprising (i) 10 to 70 weight percent of at least one organic epoxide compound with an epoxide functionality of at least one, (ii) 1 to 55 weight percent of at least one epoxide hardener, (iii) 5 to 50 weight percent of an essentially halogen-free fire-retardant system that includes a mixture of: (1) at least one compound selected from the group comprising alkaline earth metal hydroxides and aluminium group hydroxides, and (2) at least one phosphorous-containing material, (iv) 10 to 60 weight percent of a filler system capable of reducing the density of the precursor that includes a mixture of (1) at least one low-density inorganic filler having a density of between 0.1 to 0.5 g cm$^{-3}$, (2) at least one low-density organic filler having a density of between 0.01 to 0.30 g/cm$^{-3}$ and being compressible.

17 Claims, No Drawings

FIRE-RETARDANT LOW-DENSITY EPOXY COMPOSITION

FIELD OF THE INVENTION

The present invention relates to the curable precursor of a fire-retardant, low-density and essentially halogen-free epoxy composition and to the epoxy composition which is obtainable by curing such precursor. The precursor and the cured epoxy composition are particularly useful in aerospace applications for bonding, sealing and/or insulating metal, plastic and composite parts.

BACKGROUND OF THE INVENTION

Materials and semi-finished products which are suitable for applications in the aerospace industry and in particular for applications in aircraft interiors need to meet a demanding property profile which is described in specifications issued by the manufacturers of aircrafts. The required property profile includes a high flame retardation and low emission of smoke and toxic gases while burning.

The materials furthermore need to exhibit good mechanical properties such as a high compressive strength.

It is another overriding requirement that materials useful for the aerospace industry need to be low-weight, i.e. the materials need to exhibit a low density.

It is also required that the curable precursors of such materials exhibit a desirable viscosity and preferably a low viscosity increase with time at ambient temperature so that they can be processed, for example, by extruders, equipment comprising pumps or other conventional application equipment.

The cured materials and the corresponding precursors which are disclosed in the prior art do not always meet this property profile to a required and/or desirable extent.

U.S. Pat. No. 5,019,605 describes, for example, a low density, fire resistant one-part epoxy composition comprising
(a) from 10 to 75 percent by weight of an organic epoxide compound having an epoxide functionality of at least 1;
(b) from 1 to 25 percent by weight of an epoxide hardener;
(c) from 20 to 50 percent by weight of a smoke suppressant;
(d) from 10 to 25 percent by weight of a filler capable of reducing the density of said composition; and
(e) from 1 to 10 percent by weight of an organic phosphorous-containing compound selected from the group consisting of alkyl phosphates, aryl phosphates, alkylphosphonates, aryl phosphonates, and mixtures thereof,
wherein said composition contains from about 3 to 10 weight percent bromine.

This composition provides smoke suppression and has an excellent compressive strength but is potentially toxic while burning due to the bromine content.

EP 0,814,121 discloses processable one-part precursors of a low-density-fire-retardant epoxy-based composition which preferably also comprise a bromine source.

EP 0,693,092, EP 0,459,951 and WO 99/45,061 disclose essentially halogen-free fire-resistant epoxy compositions. EP 0,693,092 discloses the use of low-density fillers such as hollow glass microspheres in order to reduce the weight and the density of the cured epoxy compositions while maintaining a high compressive strength. A similar approach is used in EP 0,459,951 which prefers a combination of glass balloons and fumed silica as fillers. The hollow glass microspheres typically have a density of about 0.25 to 0.35 g/cm$^3$ so that a relatively high amount of glass microspheres needs to be added to the compositions in order to provide a desirable decrease in weight and density of the compositions. This is recognized, for example, in U.S. Pat. No. 6,635,202 where it is stated that significant quantities of hollow glass microspheres need to be included into processable syntactic epoxy-based pastes in order to decrease the density of the cured paste to a value of below 0.6 g/cm$^3$. U.S. Pat. No. '202 also discloses that a high loading with glass microspheres results in a sharp increase in viscosity so that the uncured pasty precursor requires kneading by hand or a dough mixer. It was found by the present inventors that the addition of higher amounts of glass microspheres to state-of-the-art compositions of, for example, more than 25 weight percent and, in particular, of more than 27.5 weight percent with respect to the mass of the composition tends to increase the viscosity and hence to decrease the processability of the precursor of such conventional epoxy-based fire-retardant compositions to an undesirable and often not acceptable degree.

U.S. Pat. No. 6,635,202 discloses a thermally expanding epoxy-based powder that can be used as a void-filling material for honeycomb sandwich panels which are used in the aerospace industry. The powder comprises an epoxy compound, an epoxy hardener and a filler component which comprises an unexpanded thermoplastic microsphere, optionally in combination with an inorganic filler such as fumed silica. The powdery precursor is obtained by mixing the starting compounds at temperatures below the onset temperature of the epoxy compound and below the temperature where expansion of the unexpanded thermoplastic microspheres occurs. The powders of U.S. Pat. No. '202 are filled in a honeycomb structure and heated thereby expanding, foaming and curing the powder.

The powders of U.S. Pat. No. '202 cannot be used in vertical bonding geometries which limits their applicability. Foaming adhesives can furthermore only be used in specific applications. The compressive strength of the cured powders of U.S. Pat. No. '202 does furthermore not always meet practical requirements.

It was therefore an object of the present invention to provide a low-weight fire-retardant composition which when burning has a low emission of smoke and toxic gases and which is versatile in its technical applicability. It was another object of the present invention to provide a flame-retardant epoxy composition which upon curing exhibits favourable mechanical properties such as, in particular, a high compressive strength and a low density of preferably not more than 0.6 g/cm$^3$ while the precursor of such composition is characterized by a good or at least acceptable processability such as, in particular, a good extendibility. Other objects of the present invention can be taken from the following detailed specification.

SUMMARY OF THE INVENTION

The present invention relates to a curable precursor of a fire-retardant, low-density and essentially halogen-free epoxy composition comprising
(i) 10 to 70 weight percent of at least one organic epoxide compound with an epoxide functionality of at least one,
(ii) 1 to 55 weight percent of at least one epoxide hardener,
(iii) 5 to 50 weight percent of an essentially halogen-free fire-retardant system that includes a mixture of:
(1) at least one compound selected from the group comprising alkaline earth metal hydroxides and aluminium group hydroxides, and
(2) at least one phosphorous-containing material,
(iv) 10 to 60 weight percent of a filler system capable of reducing the density of the precursor that includes a mixture of
(1) at least one low-density inorganic filler having a density of between 0.1 to 0.5 g cm$^{-3}$,
(2) at least one low-density organic filler having a density of between 0.01 to 0.30 g/cm$^{-3}$ and being compressible.

The present invention furthermore relates to a fire-retardant, low-density and essentially halogen-free epoxy composition which is obtainable by curing a precursor of the present invention, said cured epoxy composition having a compression strength at room temperature of at least 16 MPa and/or a compression strength at 80° C. of at least 7 Mpa.

The present invention furthermore relates to the use of a precursor of the present invention for void filling applications.

DETAILED DESCRIPTION OF THE INVENTION

As used above and below, the term "processable" refers to precursors of epoxy-based compositions which have an Initial Extrusion Rate measured as described in the test section below which is at least 60 g/min, preferably at least 120 g/min, more preferably at least 140 g/min and especially preferably at least 150 g/min.

As used above and below, the term "low-density" refers to cured fire-retardant epoxy-based compositions which exhibit a density of less than 0.8 $g/cm^3$, more preferably of not more than 0.65 $g/cm^3$ and especially preferably between 0.5 and 0.6 $g/cm^3$ as measured according to the test section below.

As used herein, "essentially halogen-free" means that the compositions contain no more than a trace amount of halogen. Typical epoxide preparation techniques may result in a material that contains several halogen atoms or halogen-containing molecules. However, such materials are considered to be essentially halogen-free within the scope of the invention. Preferably, the compositions of the invention contain no more than about 50 parts of halogen per million parts of epoxy and, more preferably, no more than about 5 parts per million.

Flame retardation is assessed by performing the vertical burn test according to Airbus Directive (ABD) 00031, Issue D, September 2002, referred to in the test section below. This test gives a self-extinguishing time. The smoke density is measured according to JAWFAR (Joint Aviation Requirements/Federal Aviation Regulations), Part 25, Appendix F, Part V, referred to in the test section below. A cured low-density, essentially halogen-free, epoxy-based composition is termed "fire-retardant" if the self-extinguishing time is less than 15 sec and/or if the smoke density is less than 200.

Any organic compound having an oxirane ring polymerizable by a ring opening reaction may be used as the organic epoxide in the precursors and compositions of the invention. Such materials, broadly called epoxides, include monomeric epoxy compounds and polymeric epoxy compounds and can be aliphatic, cycloaliphatic, aromatic or heterocyclic. Useful materials generally have at least two polymerizable epoxy groups per molecule and, more preferably, from two to four polymerizable epoxy groups per molecule.

The organic epoxide may vary from low molecular weight monomeric products to high molecular weight polymers and may also vary greatly in the nature of the backbone and any substituent groups. The molecular weight may vary from 58 to about 100,000 or more. The backbone may be of any type and is essentially halogen-free. Any substituents are also essentially halogen-free and may otherwise be any group not having a nucleophilic or an electrophilic moiety (such as an active hydrogen atom) that is reactive with an oxirane ring. Permissible substituents include ester groups, ether groups, sulfonate groups, siloxane groups, nitro groups, amide groups, nitrile groups, phosphate groups, etc. Mixtures of various organic epoxides may also be used in the compositions of the invention.

Preferred organic epoxides are selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof. More preferably, the organic epoxide is selected from the group consisting of diglycidyl ethers of bisphenol A and epoxy novolacs.

The precursors of the present invention preferably comprise one or more liquid, low molecular weight epoxides which are frequently termed as reactive epoxy thinners or reactive epoxy diluents. These compounds are preferably selected from the group of di- and polyglycidyl ethers of di- and polyphenols or aliphatic or cycloaliphatic hydroxy compounds. Reactive epoxy diluents typically exhibit a molecular weight of less than 700, and they may preferably be used in a concentration range from 1 to 20 percent by weight, more preferably from 1 to 15 percent by weight and especially preferably from 1-10 percent by weight with respect to the mass of the epoxide component comprising one or more epoxide compounds.

Epoxide compounds which are suitable for the precursor and the cured compositions of the present invention are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or there between.

More preferably, the organic epoxide is selected from the group comprising diglycidyl ethers of bisphenol A and bisphenol F and epoxy novolacs.

Other useful organic epoxides include those disclosed in U.S. Pat. Nos. 5,019,605; 4,145,369; 3,445,436; 3,018,262, and "Handbook of Epoxy Resins" by Lee and Neville, McGraw Hill Book Co., New York (1967).

The precursor of the low-density, flame-retardant and essentially halogen-free epoxy-based compositions of the present invention comprises 10 to 70 percent by weight, preferably from 15 to 60 percent by weight, more preferably from 15 to 55 percent by weight and especially preferably from 15 to 50 percent by weight of one or more epoxide compounds.

Epoxide hardeners useful in the present invention are materials that react with the oxirane ring of the organic epoxide to cause substantial cross-linking of the epoxide. These materials contain at least one nucleophilic or electrophilic moiety (such as an active hydrogen atom) that causes the cross-linking reaction to occur. Epoxide hardeners are distinct from epoxide chain extension agents which primarily become lodged between chains of the organic epoxide and cause little, if any cross-linking. Epoxy hardeners as used herein are also known in the art as curing agents, catalysts, epoxy curatives, and curatives.

Epoxy hardeners which are useful in the present invention are preferably selected from a group comprising substituted ureas such as toluene diisocyanate urea and dicyandiamides. Especially preferred is the following smaller group of commercially available hardeners comprising 1-cyanoguanidine (commercially available as Dicyandiamide CG 1200) and 1,1 methylene bis(phenyldimethyl urea), (commercially available as Omicure 52).

It was furthermore found that precursors of the present invention comprising anhydride hardeners such as, for example, 4-methyltetrahydroxy phthalic acid anhydride, NMA (=Nadic Methyl Anhydride), 5-methyl-2,3-dicarboxynorbornene anhydride or methylnorbornene phthalic acid anhydrides, especially when used in combination with imidazote type hardeners such as Curezol ZPH7 or Curezol MZ-azine, are preferred.

Other epoxy hardeners which are useful in the present invention include amine-based hardeners like, for example, di(4-aminophenyl)sulfone, di-(4-aminophenyl)-ethers, 2,2-bis(4-aminophenyl)propane or diethylene triamine hardeners. Amine-based hardeners typically allow for a longer shelf-life time of the corresponding precursors. Since amine-based hardeners generally result in rapid curing the curing reaction of the corresponding precursor may become highly exothermic which may thermally damage, in particular, thicker layers of the precursor during curing. Amine-based hardeners are therefore typically less advantageous if the precursor is to be applied in layers with a thickness of more than 30 mm.

Sometimes it is differentiated between epoxide hardeners and accelerators which are used to increase the rate of the epoxide curing reaction. Accelerators typically are multifunctional materials which can also be classified as epoxide hardeners. Compounds which are sometimes referred to in the literature as accelerators include, for example, imidazoles, imidazole derivatives, imidazole-like compounds and the like. Specific examples include, for example, 2-(2-(2 methylimidazolyl)-ethyl)-4,6-diamino-s-triazine. In the present specification, no differentiation is made between hardeners and accelerators.

The precursors of the present invention comprise one or more hardener compounds, preferably 1 to 4 and more preferably 1 to 3 hardener compounds. The concentration of the hardener component comprising one or more hardener compounds, preferably is from 1 to 55 percent by weight with respect to the epoxy-based composition, more preferably from 2 to 50 percent by weight and especially preferably from 10 to 45 percent by weight.

The precursors of the present invention further comprise from 5 to 50 weight percent and preferably from 10 to 50 weight percent of an essentially halogen-free fire-retardant system that includes a mixture of:
(1) at least one compound selected from the group comprising alkaline earth metal hydroxides and aluminium group hydroxides, and
(2) at least one phosphorous-containing material.

The compounds of group (1) comprising alkaline earth metal hydroxides and aluminium group hydroxides are often referred to as smoke suppressants. Especially preferred compounds include aluminium trihydrate (=aluminium oxide trihydrate, sometimes also referred to as aluminium hydroxide) and magnesium hydroxide.

The phosphorous-containing material (2) may be selected from a group comprising, for example, elemental red phosphorous, melamine phosphate, dimelamine phosphate, melamine pyrophosphate and inorganic phosphinates such as, for example, aluminium phosphinates. Elemental red phosphorous and inorganic phosphinates are preferred.

The fire-resistant system may also include an optional boron-containing material, such as those selected from the group consisting of barium metaborates, calcium metaborates, zinc metaborates and mixtures thereof. These materials may provide up to 25 weight percent with respect to the mass of the precursor.

It is essential in the present invention that the precursor comprises 10 to 60 weight percent of a filler system capable of reducing the density of the precursor that includes a mixture of
(1) at least one low-density inorganic filler having a density of between 0.1 to 0.5 g/cm$^{-3}$,
(2) at least one low-density organic filler having a density of between 0.01 to 0.30 g/cm$^3$ and being compressible.

In such filler system the mass ratio of said at least one inorganic filler (1) over said at least one organic filler (2) preferably is between 2 and 400.

The low-density inorganic fillers are preferably selected from a group comprising hollow inorganic microspheres. The shell of such inorganic microspheres may be selected from a variety of materials including by way of example glass, ceramic (including sol-gel derived) or zirconia.

These inorganic microspheres are preferably selected so that they allow for an advantageous density of the cured composition without sacrificing its compressive strength. The inorganic microspheres are therefore preferably selected so that they essentially survive the processing of the precursor including any mixing and extrusion step.

The hollow inorganic microspheres exhibit a density of less than 0.5 g/cm$^3$, more preferably of between 0.1 and 0.45 g/cm$^3$ and especially preferably of between 0.1 and 0.4 g/cm$^3$.

The hollow inorganic microspheres furthermore exhibit an advantageous crush strength. They are preferably selected so that at least 85% and more preferably at least 90% of an amount of such microspheres included into the precursor survive the application of a pressure of at least 2,500 and more preferably of at least 4,000 psi (pounds per square inch) to the precursor.

The hollow inorganic microspheres useful in the present invention preferably form free flowing powders that preferably have a relatively homogenous particle size. The average particle size typically is between 1 and 300 μm and more preferably between 10 and 100 μm. The hollow inorganic microspheres introduced into the precursor furthermore preferably exhibit a low amount of less than 5 weight percent and more preferably of less than 2.5 weight percent of broken microspheres. This can be obtained by floating the microspheres subsequent to their manufacture in a water bath and collecting the microspheres on the water surface only. These microspheres are also referred to as flirted microspheres.

The hollow inorganic microspheres useful in the present invention preferably have a smooth outer surface rather than a rough outer surface because the latter tends to make the precursor more viscous and difficult to process.

Especially preferred hollow inorganic microspheres include glass microspheres which are commercially available, for example, from 3M Company under the trade designation Scotchlite D32/4500. These microspheres exhibit the following particle size distribution: 10 vol. % of the microspheres have a diameter of less than 20 μm, 50 vol. % have a diameter of less than 40 μm, 90 vol. % have a diameter of less than 70 μm and 95% of less than 85 μm. The diameter of 85 μm is also referred to as effective top size. The microspheres of D32/4500 have a density of 0.32 g/cm$^3$ and an advantageous crush strength.

It was found by the present inventors that the filler system of the precursor of the present invention needs to include at least one low-density inorganic filler and more preferably at least one low-density hollow inorganic microsphere filler in order to decrease the density of the cured epoxy composition and to impart a sufficient compressive strength both a at room temperature and at an elevated temperature of 80° C. to the cured epoxy composition.

The precursor preferably comprises between 9 to 35 weight percent, more preferably between 15 to 30 weight percent and especially preferably between 17.5 to 27.5 weight percent of one or more low-density inorganic fillers, and, more particularly, of one or more low-density inorganic hollow microspheres. It was found by the present inventors that the compressive strength of the cured epoxy composition tends to be insufficient if the concentration of the low-density inorganic fillers is lower than 9 weight percent. If the concentration of the one or more low-density inorganic fillers exceeds 35 weight percent, the processability of the precursor tends to be unacceptable for most practical applications; more specifically it was found that the initial extrusion rate measured as described in the test section below, may drop below 50 g/min if the precursor of the present invention comprises more than 35 weight percent of one or more hollow inorganic microspheres.

It was surprisingly found by the present inventors that the decrease in the initial extrusion rate which is observed when increasing the concentration of the one or more low-density inorganic fillers, can be counter-balanced by including into the filler systems of the present invention one or more low-density organic and, in particular, one or more low-density polymeric fillers which have a density of between 0.01 and 0.3 g/cm$^{-3}$ and which are compressible. The volume of compressible organic microspheres is decreased when they are subjected to a pressure of, for example, 5 bar which is used in the Extrusion Rate test method detailed below. Compressible organic fillers generally tend to result in a reduction of the compressive strength of cured epoxy compositions. The compressible organic fillers used in the present invention are therefore preferably selected to improve the processability of the uncured precursor and/or the density of the corresponding cured epoxy composition while adversely affecting the compressive strength of the precursor to a low degree irrelevant for practical purposes and/or to an acceptable degree only. Consequently, compressible organic fillers which are preferred in the present invention provide when added to the composition of Comparative Example 1 disclosed below in an amount of 1 weight percent, cured epoxy compositions exhibiting a compressive strength at room temperature (23° C.) measured as indicated below of at least 30 MPa, more preferably of at least 32.5 MPa and, especially preferably of at least 35 MPa.

The compressible low-density organic fillers are preferably selected from a group comprising pre-expanded organic hollow microsphere fillers.

In the prior art unexpanded, i.e. non-pre-expanded organic hollow microsphere fillers have been used in fire-retardant epoxy compositions as a foaming agent as is disclosed, for example, in EP 0,693,092. U.S. Pat. No. 6,635,202 discloses the use of unexpanded organic hollow microsphere fillers in thermally expandable and foamable powders for void filling applications. It was found, however, by the present inventor that precursors of epoxy compositions comprising unexpanded organic hollow microspheres may exhibit unfavourable mechanical properties and, in particular, a low compressive strength upon curing.

Unexpanded organic hollow microsphere fillers are available, for example, from Akzo Nobel under the trade designation "Expancel®". The Expancel fillers comprise a polymer shell encapsulating an essentially liquid gas such as, for example, liquid isobutane. When included into the curable precursor of an epoxy composition, the unexpanded organic hollow microsphere fillers expand when the temperature is raised to effect curing so that the composition expands and foams during curing. The expansion of such composition when cured, for example, in a cuboidical mould typically is not uniform but may be higher in the middle of the mould and lower at the edges so that a curved surface results. This is not desirable in many applications. When using the precursor, for example, for filling a honeycomb structure with subsequent curing, the cured composition is required to exhibit a flat surface in many applications.

The Expancel type unexpanded hollow organic microspheres are available in different qualities which are characterized by different onset temperatures for expansion which can be selected depending on the curing temperature of the precursor. The onset temperature typically is between 80 to 130° C. The expansion rate depends, for example, on the difference between the curing temperature and the onset temperature for expansion and is typically adjusted so that the epoxy composition is distinctly expanded, i.e. foamed, during curing.

Unexpanded organic hollow microspheres are sometimes also referred to as expandable organic microballoons which are also available, for example, from Lehmann and Voss, Hamburg, Germany under the trade designation Micropearl.

The unexpanded organic hollow microspheres typically exhibit an average diameter of between 5 to 30 μm prior which may be increased by a factor of between 2 and 6 and more typically of between 3 and 5 upon full expansion of the microspheres.

It was now surprisingly found by the present inventors that the inclusion of one or more compressible low-density organic and/or polymeric fillers and, in particular, of one or more pre-expanded hollow organic and/or polymeric microsphere fillers into the precursor of the present invention improves the processability of the precursor and/or the density of the cured epoxy compositions while the compressive strength of resulting cured epoxy compositions is not adversely affected or adversely affected to an acceptable degree only, respectively.

The non-pre-expanded, expandable microspheres are essentially non-compressible because they include an essentially non-compressible liquid gas. Contrary to this, the pre-expanded microspheres are compressible and more preferably elastically compressible, i.e. they essentially return to their original shape and/or dimension when the pressure is removed.

Pre-expanded organic hollow microspheres are commercially available, for example, from Lehmann & Voss, Hamburg, Germany under the trade designation Dualite. The pre-expanded organic microspheres may comprise a polymer shell comprising, for example, acrylonitrile/acrylate copolymers or vinylidenechloride/acrylonitrile copolymers. The shell encapsulates a core comprising, for example, one or more essentially gaseous hydrocarbons. The average diameter of pre-expanded organic hollow microspheres preferably is between 15 and 200 μm and more preferably between 20 and 180 μm.

The pre-expanded hollow organic microspheres useful in the present invention preferably exhibit a degree of expansion with respect to the maximum expansibility at the curing temperature prior to rupturing of at least 50 percent, more preferably of at least 70 percent and especially preferably of at least 80 percent. It was found that the increase in the Initial Extrusion Rate of a specific precursor in comparison to the Initial Extrusion Rate of a corresponding precursor comprising no pre-expanded hollow microspheres, is—for a given compound and concentration of such pre-expanded microspheres—the greater the higher the degree of expansion of the pre-expanded microspheres. For some applications it is, however, also desirable to allow for a certain expansion of the precursor during curing in order to impart and/or improve gap-filling properties to the precursor and/or to improve such gap-filling properties. For these applications it may be desirable to use incompletely pre-expanded hollow microspheres wherein the degree of expansion and the concentration of the pre-expanded hollow microspheres is preferably selected so that the volume increase of the cured epoxy composition with respect to the volume of the precursor is between 0.01 and 1.5 vol. percent and more preferably between 0.02 and 1.0 vol. percent. The degree of expansion of the pre-expanded hollow microspheres is furthermore preferably selected so that the pre-expanded hollow microspheres have a density of less than 0.3 g/cm$^3$ and more preferably between 0.01 and 0.25 g/cm$^3$.

It was furthermore found that the inclusion of the pre-expanded hollow organic microspheres may result in a decrease of the density of the cured epoxy composition as compared to the density of the corresponding cured epoxy composition comprising no pre-expanded hollow microspheres. The decrease in density is usually more pronounced if the pre-expanded hollow organic microspheres survive the application process of the precursor and the subsequent curing step essentially without rupturing. Rupturing of the pre-expanded hollow organic microspheres during application of the precursor by, for example, extrusion or during curing of the precursor is not detrimental to the properties of the resulting cured epoxy composition because the fragments of the organic microspheres are incorporated into the epoxy network structure. It was surprisingly found that the processability and/or extrudability of the precursor of the present invention can be distinctly improved even for relatively low concentrations of the one or more low-density organic fillers (2).

The precursor of the present invention preferably comprises between 0.25 and 3 weight percent and more preferably between 0.3 and 2 weight percent of one or more low-density organic fillers (2) having a density of between 0.01 g/cm$^3$ and 0.3 g/cm$^3$ and being compressible, and more preferably of at least one pre-expanded hollow organic microsphere. If the concentration of such low-density organic fillers is less than 0.25 weight percent, the processability of a precursor having a viscosity and/or processability properties which are not acceptable and/or unfavourable for many applications, may not be sufficiently improved. If the concentration of such low-density organic fillers is more than 3 weight percent, the mechanical properties of the cured epoxy composition such as, for example, the compressive strength at room temperature and/or elevated temperature, may be too low for various practical requirements.

The concentration of the low-density inorganic fillers (1) and of the low-density organic fillers (2) of the filler system of the present invention are preferably selected so that the density of the cured epoxy composition is less than 0.65 g/cm$^3$, more preferably less than 0.6 g/cm$^3$ and especially preferably between 0.5 and 0.6 g/cm$^3$.

It was found by the present inventors that a good balance between an advantageous low density and favourable mechanical properties of the cured epoxy composition on the one hand and a favourable processability of the precursor of such composition on the other hand are preferably obtained when the low-density inorganic filler (1) of the filler system is present in excess. The ratio of the mass of the at least one or more low-density inorganic fillers (1) over the mass of the at least one or more low-density organic filler (2) of the filler system preferably is between 2 and 400, more preferably between 5 and 200 and especially preferably between 10 and 80.

The precursors and the cured epoxy compositions of the present invention are characterized by a balanced property profile of advantageous fire-resistant properties in combination with
a low density,
a low viscosity,
advantageous mechanical properties, and
a good processability.

This advantageous property profile is not obtained when replacing, for example, the pre-expanded hollow organic microspheres with the corresponding unexpanded hollow microspheres. Although the present inventors do not wish to be bound by such theory, it is speculated that, for example, in the preferred embodiments of the present invention, the compressible pre-expanded hollow organic microspheres act as a lubricant between the rigid and non-compressible inorganic hollow microspheres. The pre-expanded hollow organic microspheres are thus believed to allow for a high concentration of the inorganic hollow microspheres in the precursor of the present invention in order to provide desirable mechanical properties and a low density of the cured epoxy resin while improving at the same time the processability and extendibility of the precursor.

The filler system of the precursor of the present invention may comprise other fillers which are used to further regulate rheological properties of the precursor and adjust its viscosity to further improve processability. These additional fillers include, for example, inorganic fillers including silica. Especially preferred is hydrophobic fumed silica which is commercially available as Aerosil from Degussa or CAB-O-SIL® from Cabot. The nature and the amount of such additional fillers is preferably selected so that the advantageous property profile of the precursors and the cured epoxy compositions of the present invention is not adversely affected or is adversely affected to an acceptable degree only, respectively.

The precursors of the present invention may comprise other optional ingredients such as wetting agents, which are preferably selected from the group consisting of titanates, silanes, zirconates, zircoaluminates, phosphoric ester(s) and mixtures thereof. The wetting agent improves the mixability and processability of the composition and can also enhance the composition's handling characteristics. Useful wetting agents are disclosed in U.S. Pat. No. 5,019,605. An especially useful wetting agent is commercially available as Coatex D0-UP6L from Coatex, Genay, France. The concentration of the wetting agent component comprising one or more wetting agents is typically lower than 6 percent by weight and more preferably not more than 5 percent by weight.

The precursors of the invention can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the precursor is mixed at a temperature of less than 35° C. Additionally, slow mixing speeds are generally used to help prevent heat build-up in the mixer and to minimize breakage of any inorganic and/or organic hollow microspheres employed. Mixing is continued until the components form a homogeneous mixture, after which time the precursor is removed from the mixer.

Due to their excellent processability, the precursors can be applied by conventional application equipment such as extruders or equipment providing pumps.

The precursors of the present invention preferably are one-part compositions, i.e. they already comprise the hardener component. One-part precursors of the present invention preferably exhibit an excellent shelf life time at room temperature of typically 90 days or more.

The precursor can be applied to various substrates such as, for example, metals (for example, Al, Al alloys, titanium or stainless steel) or other substrates comprising, for example, glass, boron, carbon, Kevlar fibers, epoxy, phenols, cyanate esters and polyester matrices. It may be applied, for example, as a thin coating with a thickness of typically up to 3 mm. It may also be used for the preparation of bulky articles like, for example, for the construction of composite floor panels or walls used in aircraft interiors. Such floor panels or walls typically comprise a honeycomb structure with a thickness of typically from 1 mm to 50 mm which is filled with the precursor.

The precursor is subsequently preferably thermally cured. The curing conditions can be widely varied depending on the specific application. The curing temperature is typically chosen between 105° C. and 180° C., and the curing time typically amounts to between 15 and 180 minutes.

The precursors of the epoxy-based compositions according to the invention are characterized by an excellent processability and exhibit both an advantageous initial viscosity (evaluated, for example, in terms of initial extrusion rate) and a low increase of viscosity with time (evaluated, for example, in terms of extrusion rate after 8 or 21 days, respectively).

The low-density, fire-retardant epoxy-based compositions which are obtainable by curing the corresponding precursors are characterized by an advantageous fire-retardation evaluated, for example, in terms of smoke density and/or extinguishing time, and they furthermore exhibit advantageous mechanical properties evaluated, for example, in terms of compressive strength. The precursor and cured compositions of the present invention are, in particular, useful for aerospace applications because they are easily applicable, lightweight and fire-resistant materials which are capable of withstanding the forces encountered when used at the interface of a pressurized and non-pressurized zone.

A particularly preferred precursor of a fire-retardant, low-density and essentially halogen-free epoxy composition comprises
(i) 10-30 weight percent of at least one organic epoxy compound with an epoxide functionality of from 1 to 4,
(ii) 1-6 weight percent of at least one reactive epoxy diluent,
(iii) 10-40 weight percent of at least one epoxy hardener,
(iv) 15-40 weight percent of an essentially halogen-free fire-retardant system that includes a mixture of:
 (1) a least one compound selected from the group comprising alkaline earth metal hydroxides and aluminium group hydroxides, and
 (2) at least one phosphorous-containing material,
(v) 15-40 weight percent of a filler system capable of reducing the density of the precursor that includes a mixture of
 (1) at least one low-density inorganic hollow microspheric filler having a density of between 0.1 to 0.5 g/cm$^{-3}$,
 (2) at least one low-density organic pre-expanded hollow filler having a density of between 0.01 to 0.25 g/cm$^3$ and,
(vi) 0-10 weight percent, more preferably 0.1-5 wt. % of one or more wetting agents
wherein the mass ratio of said at least one inorganic filler (1) over said at least one organic filler (2) is between 5 and 200.

The invention is furthermore illustrated by the examples described below. Prior to that some test methods used to characterize the precursors and cured epoxy-based composition will be described.

Unless specified otherwise, percentages are percentages by weight with respect to the mass of the precursor or the cured epoxy-based composition, respectively. Above and below, the mass percentages of all components of a precursor or a cured composition, respectively, add up in each case to 100 weight percent.

Test Methods
Extrusion Rate

The processability of the precursor of the low-density epoxy-based composition was evaluated at room temperature (23° C.) by extruding it through standard equipment using the following procedure. An air driven application pistol (available from SEMCO, East Kilbride, U.K) was fitted with a 150 ml disposable cartridge and a nozzle having an aperture of 5.6 mm. The disposable cartridge was filled with precursor and by applying an air pressure of 5 bars the low-density epoxy composition was extruded. The extrusion rate was determined by measuring the time required for an extrusion of 80 g precursor.

Measurements were made immediately after the precursor was prepared (initial extrusion rate). Each precursor was evaluated 3 times and the results averaged.

Compressive Strength

Compressive strength of the cured epoxy-based composition was measured according to DIN 53454.

About 200 g of the precursor was cast into a release-coated mould having the dimensions of 12.5 mm (height)×12.5 mm (width)×25 mm (length) and being open on one major side.

The mould was placed in a forced air oven and subjected to a curing program. The oven temperature was raised from 23° C. to 125° C. using a heating rate of 3-5° C./min. Then the temperature was held at 125° C. for 1 hour, in order to cure the epoxy-based composition. After the curing for 1 hour at 125° C. was completed, the cured epoxy-based composition was cooled down to 23° C. over a period of 45 minutes.

The test specimens were compressed along their 25 mm axis at a rate of 0.5 mm/min by using a Zwick Model Z030 Tensile Tester (Zwick GmbH & CO., Ulm, Germany), equipped with heating capability.

Compressive strength was measured both at 23° C. (room temperature) and 80° C. The test specimens were preconditioned in the heated equipment for at least 30 minutes before testing at 80° C.

At least three samples were measured for each epoxy composition and the results averaged and recorded in MPa.

Density

Density of the cured epoxy-based compositions was measured according to DIN 53479A. Samples of the epoxy-based composition were prepared by casting the corresponding precursors into moulds and curing in a forced air oven using a temperature program as described under the test method "Compressive Strength", as described previously. The cured samples of the epoxy-based composition were removed from the moulds and their exact dimensions recorded. Each sample was weighed and the density calculated and recorded in grams per cm$^3$.

Smoke Density

A sheet having a thickness of 3-5 mm was poured into an aluminium release-treated mould and cured in an air forced oven using the same temperature program as described previously for the compressive strength test. Samples having the dimensions of 3 mm×75 mm×75 mm were then cut from this large sheet. The surface of one side was abraded with sandpaper to insure that the exposed resin was representative of the overall composition.

The NBS smoke density chamber (NBS=National Bureau of Standards) was used to measure smoke density. This test method is described in detail in JAR/FAR Part 25, amdt. 25-66, Appendix F, Part V (JAR/FAR=Joint Aviation Requirements/Federal Aviation Regulations); see also Airbus Directive ABD 0031, "Fireworthiness Requirements, Pressurised Section of Fuselage", Issue D, September 2002, section 5.4 "smoke-density". A sample of the epoxy-based composition was placed over a gas flame of specific dimension. Smoke generated in the chamber was measured by light transmission of a vertical light beam through the air space in the oven.

Three samples of each epoxy-based composition were tested and the results averaged.

Vertical Burn Test

The vertical burn test was performed according to Airbus Directive ABD 0031, Issue September 2002. Three test specimens with a dimension of 3 mm×75 mm×300 mm were cut off a 3 mm×400 mm×400 mm panel of epoxy composition cured in an aluminium mould. The epoxy composition was extruded in the mould of a SEMCO cartridge. The mould was cured in an air forced oven for 60 minutes at 125° C. with a heat-up rate of 3° C./min. The specimens were then tested in a flammability chamber to the 60-second vertical Bunsen burner test.

After an exposure to the flame, self-extinguishing times were measured and the results averaged for each of the three epoxy-based resin test specimen.

| | List of materials | |
|---|---|---|
| (1) | Epoxy resin | Rutapox 300/S25, 75% polyglycidyl ether of phenol formaldehyde novolac and 25% reactive diluent, available from Bakelite, Germany |
| (2) | Epoxy hardener (1) | Methyl Nadic Anhydride, Acid anhydride of methylnorborenephthalate, available from Lonza S.P.A, Italy |
| (3) | Epoxy hardener (2) (reaction accelerator) | Curezole MZ-azine, 2-(2-(2-methyl-imidazolyl)-ethyl-4,6-diamino-s-triazine, available by Shikoku Chemicals, Japan |
| (4) | Reactive epoxy diluent | Rutapox EPD HD, Diglycidyl ether of cyclohexanediol, available from Bakelite, Germany |
| (5) | Smoke suppressant | Aluminium trihydrate, Securoc A5 FS 41.0, average particle size <8 mm, available by Incemin AG |
| (6) | Flame-retardant red phosphorus | Exolit RP 6500, encapsulated red phosphorus, available from Clariant, Germany. |
| (7) | Wetting agent | Z 6040 silane, epoxy silane, available by Dow Corning |
| (8) | Hollow Glass Microspheres | Scotchlite D32/4500, effective top size 85 microns, available from 3M, St. Paul, Minnesota, U.S.A |
| (9) | Pre-Expanded Polymeric Microspheres | Dualite E065-135D, acrylonitrile co-polymer (shell), average particle size 130 μm, density: 0.065 g/cm$^3$, available from Lehmann & Voss Co., Germany |
| (10) | Non-pre-expanded Polymeric Microspheres | Micropearl F30, vinylidenechloride/acrylonitrile copolymer shell encapsulating a volatile hydrocarbon, average particle size 20-25 μm, density: 1.03 g/cm$^3$, available from Lehmann & Voss Co., Germany |

EXAMPLES

Examples 1-3

The low-density, epoxy-based compositions of Examples 1-3 were prepared by combining in each case the compounds listed in Table 1 below in a 0.5 litre mechanical mogul type mixer. In Table 1, all concentrations are given as weight percent.

A temperature of less than 35° C. was maintained during the mixing process, using water-cooling. The epoxy resin, the reactive epoxy diluent and the encapsulated red phosphorus (flame retardant) were mixed with Aluminium trihydrate and epoxy silane (wetting agent) for about 20 minutes until homogeneous. 90% of the Nadic Methyl Anhydride was then added, followed by mixing for an additional 15 minutes. Hollow glass microspheres were then stirred in followed by an additional mixing of 20 minutes.

A premix of a tertiary amine as reaction accelerator and 10% Nadic Methyl Anhydride was separately prepared by manual mixing and then added to the above mixture. In a final step the polymeric hollow microspheres were added to the mixture.

The precursors of Examples 1-3 were cured by subjecting them to the curing programme described in the test method section above, sub-section "Compressive strength".

These mixtures are pastes having a smooth and uniform consistence.

The extrusion rate of the uncured precursor of the epoxy-base composition and the compressive strength, the density, the smoke density and the self-extinguishing times of the cured epoxy-based compositions were measured as described previously in the test method section. The results of these measurements are summarized in Table 2.

Comparative Examples 1-3

Three comparative epoxy-based compositions were prepared by combining the compounds listed in Table 1 using the method described previously for Examples 1-3.

The extrusion rate of the uncured, precursor of the epoxy-base compositions and the properties of the cured epoxy compositions were measured as described in the test method section above. The results of these measurements are summarized in Table 2.

Comparative Example 3 reproduces Example 3 with the exception that the pre-expanded polymeric microsphere filler Dualite E065-135D was replaced with non-pre-expanded Micropearl filler F30. When curing the precursor of Example 3 in the mould used in the Compressive Strength test described above the cured specimen exhibited a flat surface. Contrary to this, the precursor of Comparative Example 3 when cured in such mould, resulted in a distinctly expanded cured test specimen having a curved surface.

TABLE 1

| Component | Example 1 (wt %) | Example 2 (wt %) | Example 3 (wt %) | Comparative Example 1 (wt %) | Comparative Example 2 (wt %) | Comparative Example 3 (wt %) |
|---|---|---|---|---|---|---|
| Rutapox 300/S 25 (epoxy resin) | 17.04 | 16.96 | 16.92 | 17.2 | 15.66 | 16.92 |
| Rutapox EPD HD (reactive epoxy diluent) | 3.33 | 3.31 | 3.31 | 3.35 | 3.06 | 3.31 |
| Methyl Nadic Anhydride (hardener) | 26.44 | 26.32 | 26.25 | 26.57 | 24.31 | 26.25 |
| Curezole MZ-azine (accelerator) | 0.29 | 0.29 | 0.29 | 0.3 | 0.27 | 0.29 |

TABLE 1-continued

| Component | Example 1 (wt %) | Example 2 (wt %) | Example 3 (wt %) | Comparative Example 1 (wt %) | Comparative Example 2 (wt %) | Comparative Example 3 (wt %) |
|---|---|---|---|---|---|---|
| Securoc A5 FS 41.0 (Aluminium Trihydrate) | 14.9 | 14.62 | 14.59 | 14.76 | 13.50 | 14.59 |
| Exolit RP 6500 (encapsulated red phosphorus) | 9.79 | 9.75 | 9.72 | 9.84 | 9.0 | 9.72 |
| Z 6040 Silane (epoxy silane, wetting agent) | 3.43 | 3.41 | 3.4 | 3.44 | 3.15 | 3.4 |
| Scotchlite D32/4500 (glass microspheres) | 24.49 | 24.37 | 24.31 | 24.6 | 31.0 | 24.31 |
| Dualite E065-135D (pre-expanded polymeric microspheres) | 0.49 | 0.97 | 1.2 | 0 | 0 | 0 |
| Micropearl F30 (non-pre-expanded polymeric microspheres) | 0 | 0 | 0 | 0 | 0 | 1.2 |
| Ratio of the mass Scotchlite D32/4500 over the mass of Dualite E065-135D | 50.0 | 25.1 | 20.3 | — | — | — |

TABLE 2

| Test | Example 1 | Example 2 | Example 3 | Comparative Example 1 | Comparative Example 2 | Comparative Example 3 |
|---|---|---|---|---|---|---|
| Cured Density (g/cm$^3$) | 0.62 | 0.59 | 0.57 | 0.67 | 0.57 | — |
| Initial Extrusion Rate (ml/min) | 322.5 | 372.8 | 377.2 | 432 | 78.9 | — |
| Initial Extrusion Rate (g/min) | 200 | 220 | 215 | 290 | 45 | — |
| Compressive Strength at RT (MPa) | 49.5 | 41.6 | 37.6 | 63.6 | — | 20.5 |
| Compressive Strength at 80° C. (MPa) | 18.9 | 14.8 | 12.8 | 21 | — | — |
| Smoke density | — | — | 177 | — | — | — |
| Burn length (cm) | — | — | <3 | — | — | — |
| Self-extinguishing time (sec) | — | — | <5 | — | — | — |

The invention claimed is:

1. Curable precursor of a fire-retardant, low-density and essentially halogen-free epoxy composition comprising
   (i) 10 to 70 weight percent of at least one organic epoxide compound with an epoxide functionality of at least one,
   (ii) 1 to 55 weight percent of at least one epoxide hardener,
   (iii) 5 to 50 weight percent of an essentially halogen-free fire-retardant system that includes a mixture of:
      (1) at least one compound selected from the group consisting of alkaline earth metal hydroxides and aluminum group hydroxides, and
      (2) at least one phosphorus-containing material,
   (iv) 10 to 60 weight percent of a filler system capable of reducing the density of the precursor that includes a mixture of:
      (1) at least one low-density inorganic filler having a density of between 0.1 to 0.5 g/cm$^3$,
      (2) at least one-density organic filler having a density of between 0.01 to 0.30 g/cm$^3$, wherein the at least one organic filler of the filler system is selected from the group consisting of pre-expanded polymeric microspheres.

2. Precursor according to claim 1 wherein in the filler system the mass ratio of said at least one inorganic filler (1) over said at least one organic filler (2) is between 2 and 400.

3. Precursor according to claim 1 or claim 2 wherein the at least one inorganic filler (1) of the filler system is selected from a group consisting of hollow inorganic microspheres.

4. Precursor according to any of the preceding claims wherein the at least one organic epoxide with a functionality of at least one is selected from the group consisting alkylene oxides, alkenyl oxides, glycidyl esters, glycidyl ethers, epoxy novolacs, copolymers of acrylic acid esters of glycol and copolymerizable vinyl compounds and polyurethane polyepoxides.

5. Precursor according to claim 4 wherein said at least one organic epoxide has an epoxide functionality of from 2 to 4.

6. Precursor according to claim 1 or claim 2 wherein the at least one epoxide hardener is selected from the group consisting of amines, acid anhydrides, boron complexes, guanidines and dicyandiamide.

7. Precursor according to claim 1 or claim 2 wherein the component (1) of the fire-retardant system comprises aluminum hydroxide.

8. Precursor according to claim 1 or claim 2 wherein the phosphorous-containing material of component (2) of the fire-retardant system comprises encapsulated red phosphorous.

9. Fire-retardant low-density and essentially halogen-free epoxy composition which is obtained by curing a precursor according to claim 1 or claim 2 said composition having a compression strength at room temperature of at least 16 MPa and/or a compression strength at 80° C. of at least 7 MPa.

10. A method of void filling comprising steps of a) applying a precursor claim 1 or claim 2 to a void and b) curing the precursor.

11. Precursor according to claim 3 wherein the at least one organic epoxide with a functionality of at least one is selected from the group consisting of alkylene oxides, alkenyl oxides, glycidyl esters, glycidyl ethers, epoxy novolacs, copolymers of acrylic acid esters of glycol and copolymerizable vinyl compounds and polyurethane polyepoxides.

12. Precursor according to claim 11 wherein said at least one organic epoxide has an epoxide functionality of from 2 to 4.

13. Precursor according to claim 3 wherein the at least one epoxide hardener is selected from the group consisting of amines, acid anhydrides, boron complexes, guanidines and dicyandiamide.

14. Precursor according to claim 3 wherein the component (1) of the fire-retardant system comprises aluminum hydroxide.

15. Precursor according to claim 3 wherein the phosphorous-containing material of component (2) of the fire-retardant system comprises encapsulated red phosphorous.

16. Fire-retardant low-density and essentially halogen-free epoxy composition which is obtained by curing a precursor according to claim 1 said composition having compression strength at room temperature of at least 16 MPa and/or a compression strength at 80° C. of at least 7 MPa.

17. A method of void filling comprising steps of a) applying a precursor of claim 1 to a void and b) curing the precursor.

* * * * *

UNITED STATES PATENT AND TRADEMARK OFFICE
CERTIFICATE OF CORRECTION

PATENT NO. : 8,188,165 B2
APPLICATION NO. : 11/721833
DATED : May 29, 2012
INVENTOR(S) : Sohaib Elgimiabi It is certified that error appears in the above-identified patent and that said Letters Patent is hereby corrected as shown below:

Title Page
Item (57), ABSTRACT,
  delete "0.5 g cm$^{-3}$" and insert --0.5 g/cm$^{-3}$-- therefor.

In the Specifications

Column 2
Line 64; delete "0.5 g cm$^{-3}$" and insert --0.5 g/cm$^{-3}$-- therefor.

Column 4
Line 65-66; delete "imidazote" and insert --imidazole-- therefor.

Column 7
Line 61; delete "cuboidical" and insert --cuboidal-- therefor.

Column 10
Line 37; delete "D0-UP6L" and insert --DO-UP6L-- therefor.

Column 13
List of materials; Line 37;
  delete "methylnorborenephthalate" and insert --methylnorbornenephthalate-- therefor.

In the Claims

Column 15
Claim 1, Line 59; delete "10to 70" and insert --10 to 70-- therefor.

Signed and Sealed this
Eighth Day of January, 2013

David J. Kappos
*Director of the United States Patent and Trademark Office*

Column 16
Claim 1, Line 63; delete "one-density"
 and insert --one low-density-- therefor.
Claim 1, Line 64; delete "g/cm$^3$," and insert --g/cm$^3$,-- therefor.

Column 17
Claim 4, Line 7; delete "any of the preceding claims"
 and insert --claim 1 or claim 2-- therefor.
Claim 4, Line 9; delete "consisting"
 and insert --consisting of-- therefor.

Column 18
Claim 10, Line 2; delete "precursor claim 1"
 and insert --precursor of claim 1-- therefor.
Claim 16, Line 25; delete "having"
 and insert --having a-- therefor.